US007023997B1

(12) United States Patent
Schier

(10) Patent No.: US 7,023,997 B1
(45) Date of Patent: Apr. 4, 2006

(54) SECURE MESSAGING COMMUNICATION SYSTEM

(75) Inventor: John E. Schier, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 839 days.

(21) Appl. No.: 09/745,461

(22) Filed: Dec. 21, 2000

(51) Int. Cl.
*H04L 9/00* (2006.01)
(52) U.S. Cl. ..................................... 380/277
(58) Field of Classification Search ............... 713/166; 380/277, 280, 28, 29, 30, 228, 262
See application file for complete search history.

(56) References Cited

U.S. PATENT DOCUMENTS

| 4,853,962 | A | * | 8/1989 | Brockman | 380/44 |
| 5,163,097 | A | * | 11/1992 | Pegg | 713/183 |
| 5,185,796 | A | * | 2/1993 | Wilson | 380/277 |
| 5,343,527 | A | * | 8/1994 | Moore | 713/179 |
| 5,742,686 | A | * | 4/1998 | Finley | 380/28 |
| 5,933,501 | A | * | 8/1999 | Leppek | 380/259 |
| 6,091,818 | A | * | 7/2000 | Campinos et al. | 713/155 |
| 6,686,910 | B1 | | 2/2004 | O'Donnell, Jr. | 345/179 |
| 6,744,874 | B1 | | 6/2004 | Wu | 379/220.01 |
| 6,760,420 | B1 | | 7/2004 | Heilmann et al. | 379/189 |
| 6,763,336 | B1 | | 7/2004 | Kolls | 705/44 |
| 6,768,797 | B1 | | 7/2004 | Rose | 380/247 |
| 6,907,123 | B1 | * | 6/2005 | Schier | 380/28 |

* cited by examiner

*Primary Examiner*—Gregory Morse
*Assistant Examiner*—Thomas Ho
(74) *Attorney, Agent, or Firm*—Baker Botts L.L.P.

(57) ABSTRACT

A secure telecommunication system 10 is provided that allows for communication between a device 14 and a receiving device 16 of encrypted data messages through a data communications network 12. The device 14 utilizes an encryption decryption engine 30 which is operable to execute a plurality of encryption algorithms. The encryption algorithms can be accessed using a key value that is used to access an encryption selection table 28. The encryption selection table 28 can indicate a number of encryption algorithms to be applied in sequence.

20 Claims, 4 Drawing Sheets

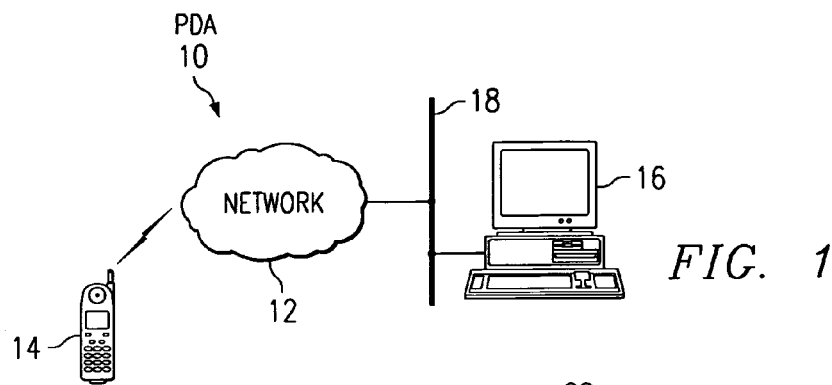
FIG. 1
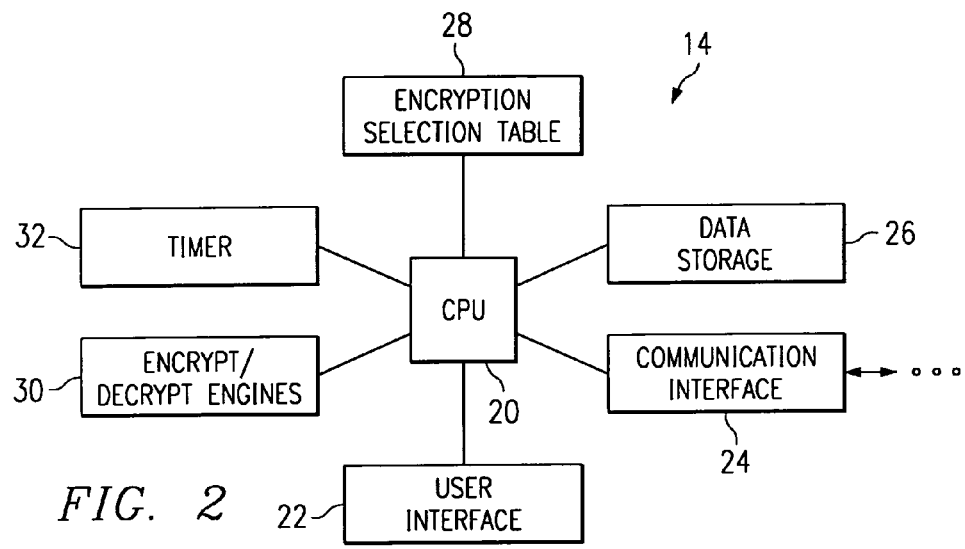
FIG. 2
| KEY | ALG1 | ALG2 | ALG3 |
|---|---|---|---|
| ⋮ | ⋮ | ⋮ | ⋮ |
| 48 | 1 | 2 | 3 |
| 49 | 2 | 3 | 4 |
| 50 | 5 | 1 | 2 |
| 51 | 4 | 3 | 1 |
| 52 | 1 | 3 | 5 |
| 53 | 5 | 3 | 1 |
| 54 | 4 | 1 | 3 |
| 55 | 5 | 1 | 5 |
| 56 | 2 | 3 | 2 |
| 57 | 4 | 1 | 5 |
| 58 | 1 | 3 | 1 |
| ⋮ | ⋮ | ⋮ | ⋮ |
FIG. 3

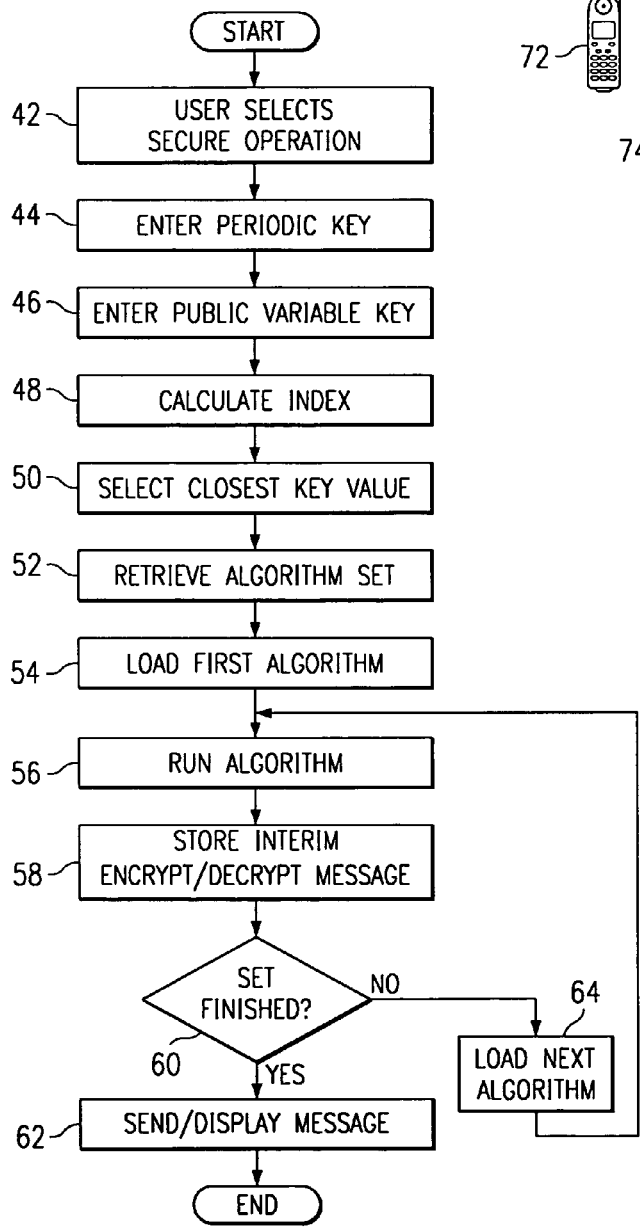
FIG. 4
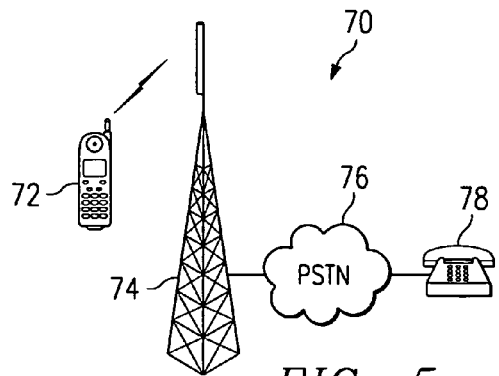
FIG. 5
FIG. 6

SECURE MESSAGING COMMUNICATION SYSTEM

TECHNICAL FIELD OF THE INVENTION

This invention relates in general to the field of electronic systems and more particularly to an improved secure communication system and method of operation.

BACKGROUND OF THE INVENTION

As the use of portable electronic devices and the growth of voice and data networks have become more pervasive, one of the most important applications of these systems has been the ability to provide point to point communication capability. These communications take the form of either real time communications in the form of voice communications or in the form of near real time communications in the form of electronic mail messages or other text messaging technologies.

Unfortunately, as networks have grown larger and as electronic devices have become more numerous, the risk of the improper interception of these messages has grown. At the same time, as the use of communication and messaging technologies has increased, the value of the information that is being transmitted has grown rapidly. The confluence of these two factors results in a great deal of highly valuable information being transmitted on a relatively insecure transmission topology.

The lack of security in data communications has been addressed in large part by the development of more sophisticated encryption algorithms. Unfortunately, the ubiquitous availability of powerful computing platforms has made it possible to defeat relatively simple encryption algorithms. This risk has forced developers to create very complex encryption algorithms. While these algorithms are difficult to defeat, they are also time consuming and require a great deal of processing power to use.

Accordingly, a need has arisen for a secure communications system and method which provide relatively high security without consuming the processor resources and time associated with undefeatable, complex encryption algorithms.

SUMMARY OF THE INVENTION

In accordance with the teachings of the present invention, a secure data communications systems is provided that substantially eliminates problems and disadvantages associated with prior solutions.

In accordance with one embodiment of the present invention, a method communicating in a secure fashion is provided that comprises providing two copies of a encryption selection table, one copy in each of two communication devices to be used to form a secure communication system. The encryption selection table is accessed using a table key which is calculated as a function of a private periodic key and a public variable key. The private periodic key is a value shared by the persons using the communication system. The public variable key is a value which is broadcast publicly enough to be accessible by both parties using the communication system and which varies over time.

According to a further embodiment of the present invention, the secure communication method of the present invention is operable to enable communication between two electronic messaging systems which are coupled through a data communication network. The electronic messaging systems may comprise, for example, personal digital assistants, personal computers or other devices which are capable of text messaging. According to this embodiment of the present invention, relatively simple encryption methods can be used sequentially to encapsulate an electronic message. The encryption key value can be used to access the encryption selection table which specifies the encryption methods and the sequence in which they are to be applied.

BRIEF DESCRIPTION OF THE DRAWINGS

A more complete understanding of the present invention may be acquired by referring to the accompanying figures in which like reference numbers indicate like features and wherein:

FIG. 1 is a block diagram illustrating one potential architecture of a secure communication system constructed according to the teachings of the present invention;

FIG. 2 is a block diagram illustrating a communication device constructed according to the teachings of the present invention;

FIG. 3 illustrates one embodiment of an encryption selection table which may be used in a secure communication system constructed according to the teachings of the present invention;

FIG. 4 is a flow diagram illustrating a method of secure communications for the exchange of encrypted text information which may be used in accordance with the teachings of the present invention;

FIG. 5 is a functional block diagram illustrating a secure communication system that may be used to provide for real time voice communications in accordance with the teachings of the present invention;

FIG. 6 is a diagram illustrating one embodiment of an encryption selection table which may be used in a secure communication system constructed according to the teachings of the present invention to implement real time voice communications.

DETAILED DESCRIPTION OF THE DRAWINGS

Figure 7:
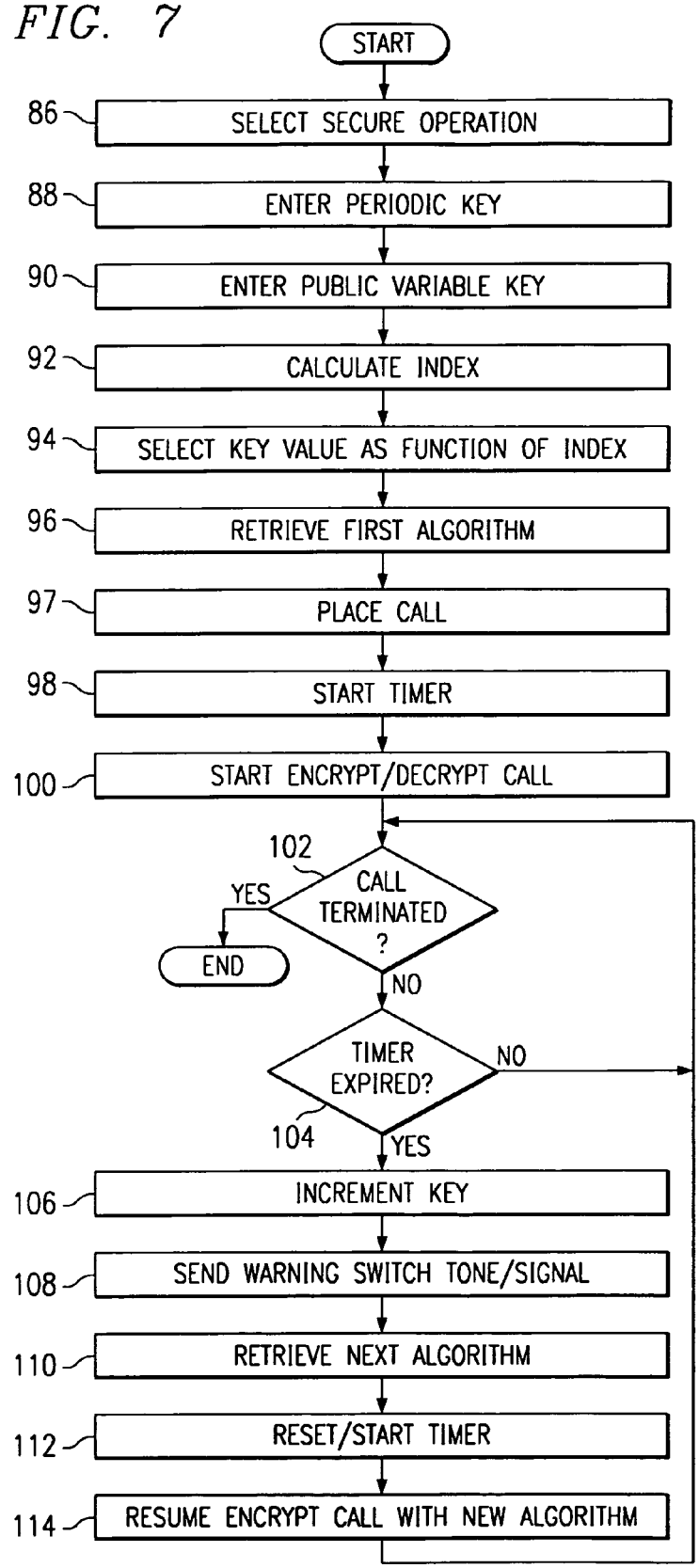
FIGS. 7 and 8 are flow diagrams which illustrate methods of sending and receiving, respectively, real time encrypted voice communications using a secure communication system constructed according to the teachings of the present invention.

Referring to FIG. 1, a secure communication system 10 is illustrated which comprises a data communication network 12. Network 12 may comprise, for example, a public data communication network such as the Internet or various forms of private or semiprivate networks such as local area networks, wide area networks, virtual private networks or the like. Data communication network 12 is utilized by electronic devices 14 and 16 to exchange electronic messages which may comprise, for example, electronic mail messages, short text messages or other forms of communication which are subject to misappropriation and therefore need to be encrypted prior to transmission and decrypted prior to reading. As shown in FIG. 1, electronic device 14 may comprise a personal digital assistant or other similar personal electronic device. Device 14 may be connected to the network 12 through either a permanent or temporary land line or as shown in FIG. 1, through a wireless connection. Device 14 functions as either a sending or a receiving device for electronic messages sent through network 12. Similarly, device 16 may comprise a personal digital assistant or similar device or as shown in FIG. 1, device 16 may comprise a personal computer which is connected to network 12 through a local area network and router connection 18 shown in FIG. 1. As with device 14, device 16 may act as either a sending or receiving device to exchange electronic messages through network 12.

According to the teachings of the present invention, it is not preferable or perhaps even feasible for devices 14 or 16 to utilize highly complex encryption techniques that cannot be defeated. This is due to the fact that undefeatable encryption technologies require either a great deal of time to implement or require an inordinate amount of processing power to implement. According to the teachings of the present invention, simple electronic devices such as device 14 and 16 which have limited processing resources and which have a limited amount of time to perform encryption technologies can still be used to send relatively secure messages through the data network 12. According to one embodiment of the present invention, simple encryption techniques can be used as long as each of the devices 14 and 16 are able to implement several disparate encryption methods in synchronization with each other. In this manner, a party attempting to defeat the encryption technique must not only undo the encryption but they must also successfully guess which method was used. According to a further embodiment of the present invention, the multiple disparate encryption techniques can be combined in sequence to further inhibit such piracy. The system of the present invention uses an encryption selection table which is resident on each sending and receiving device to enable the accurate encryption and decryption of messages.

FIG. 2 is a functional block diagram which illustrates some of the components which may be used to construct an electronic device such as device 14 which may be used in the secure communication system of the present invention. While the details of FIG. 2 will be described with reference to device 14, it should be understood that the architecture could be applied to any sending or receiving device that uses the secure communication techniques of the present invention. Referring to FIG. 2, device 14 includes a central processing unit 20 which interfaces with the user of the device through user interface 22. User interface 22 may comprise, for example, a suitable display and input devices such as keypads, touch screens, pointing devices, voice recognition systems and the like. The central processing unit 20 communicates with the network 12 through a communication interface 24. Communication interface 24 may comprise a wireless communication system which would comprise RF receivers and transmitters or it may comprise a wireline connection which would comprise suitable line signaling systems such as modem connections, network connections or the like.

Device 14 also comprises data storage system 26. Data storage system 26 may comprise both volatile and non-volatile memory systems. For example, data storage system 26 may comprise a suitable amount of dynamic random access memory. In addition, data storage system 26 may comprise magnetic or SRAM memory systems which are non-volatile in nature. In general, device 14 and specifically central processing unit 20 uses data storage system 26 to store programmatic instances of encryption algorithms and to store electronic messages which are to be encrypted, to be decrypted or which have been encrypted or decrypted. Data storage systems 26 are also used by central processing unit 20 to execute various encryption decryption algorithms and for other conventional purposes during the operation of device 14. Device 14 also includes a stored encryption selection table, the structure of an exemplary embodiment of encryption selection table 28 will be discussed with reference to FIG. 3 herein. However, in general, table 28 comprises a list of encryption algorithm identifiers which are accessed through an encryption table key. A copy of the encryption selection table is stored by both the sending and the receiving device so that the referenced encryption algorithms can be used to both encrypt and decrypt the exchanged message.

The device 14 also includes an encryption decryption engine 30 which is operable to execute a number of simple encryption and decryption algorithms as directed by the encryption selection table and under the control of the central processing unit 20. Engine 30 may comprise a single processing unit or, alternatively, may comprise multiple processing units which are able to perform encryption or decryption using the same or different algorithms simultaneously. The use of such parallel processing capability can greatly enhance the processing throughput of the overall system. Finally, the device 14 includes a timer 32 which may be used in an embodiment of the present invention that is operable to use different encryption techniques in real time communications. This embodiment of the present invention will be described more completely with reference to FIGS. 5 through 7 herein.

FIG. 3 illustrates a selected portion of one embodiment of encryption table 28 which was disclosed with reference to FIG. 2 previously. Encryption selection table 28 comprises a key column 34, a first algorithm column 36, a second algorithm column 38 and a third algorithm column 40. In operation, a particular device such as device 14 would have the capability of performing a number of distinct encryption processes. For example, device 14 may be able to perform five different encryption techniques. An encryption key in key column 34 is then used to access a particular row which specifies a particular encryption technique in each of columns 36, 38 and 40. A message to be sent by device 14 or received by device 14 can then be encrypted or decrypted using the techniques specified in the row in the order specified in the row. For example, if encryption key 51 is specified, the device 14 would first apply encryption algorithm 4, then encryption algorithm 3, then encryption algorithm 1. Conversely, if a message was received by device 14 and the key value 51 was to be used, the device 14 would first decrypt using algorithm 1 then decrypt using algorithm 3 followed by decryption using algorithm 4. In this manner, a number of relatively simple encryption steps can be sequentially applied to a message to greatly enhance the security of the message. A person attempting to intercept and wrongfully decrypt the message would have to discern not only the various kinds of encryption used, but also the order in which the techniques were used.

According to a further aspect of the present invention, the encryption table key 34 may be discerned or calculated from a number of input keys. This provides even further security in case a device such as device 14 is lost or stolen. For example, parties wishing to trade a secure message could, prior to the transfer of the message, agree on a periodic key value. For example, the two parties might agree that for a selected week, the periodic key value would be equal to 30. According to one alternative, this periodic key value could be directly used for that week as the entry point in the encryption selection table 28. Alternatively, the periodic key value could be augmented through the use of a public variable key. A public variable key comprises a number which preferably is available to both participants in the message transfer and which changes its value over time. These changes can be periodic changes such as daily changes or they can be unpredictable changes. For example, a public variable key might comprise an opening stock price for a particular company or the high temperature for a particular city on a given day as reported by an agreed upon reporting agency. Either of these numbers would be available through publicly available news media to any participant wishing to send or receive a message. The public key variable can then be combined with the periodic key variable using an agreed upon mathematical function to result in a number which can be used as the encryption table key value to enter the encryption selection table 28. For example, if the periodic key value for a given week was agreed to be 30 and the stock price on Wednesday of that week for the agreed upon company was 24 and the combination function was agreed to be addition, the encryption key value of 54 would be used by both parties and algorithms 4, 1 and 3 would be used to encrypt messages.

Depending upon the level of security desired, the calculation of the encryption key can take place in the device 14 or the system can require the user to calculate it without using the device 14. If the device 14 is used, the central processing unit 20 can perform the given calculations upon receiving the periodic key value and the public variable key value through user interface 22. Allowing device 14 to perform the calculation increases the convenience but reduces the security of the overall system because the mathematical function is encoded into the actual device. As such, a person misappropriating the particular device 14 could possibly discern the mathematical function involved. This risk can be mitigated using user interface 22. For example, user interface 22 could prompt the input of key variables without informing the user how many numbers need to be input. Accordingly, for example, without prompting as to format, a user might be required to input two two-digit numbers separated by a space in order for the encryption system to function.

FIG. 4 is a flow diagram which details the steps performed according to one embodiment of the present invention to utilize the table 28 to encrypt or decrypt messages. Referring to FIG. 4, the method starts at step 42 where a user through user interface 22 selects secure operation of a device 14. The user interface 22 then prompts the user to enter a periodic key at step 44 and a public variable key at step 46. As described previously, in order to enhance security, steps 44 and 46 could either be eliminated all together or the user could be required to enter both of these in a predetermined format without further prompting. If the two key values are entered in steps 44 and 46 the method proceeds to step 48 where the central processing unit 20 calculates an index value using the agreed upon mathematical function. As described previously, this function can be as simple as adding the two key values. However, more complex functions could also be used.

Following the calculation of the index the central processing unit 20 selects the key value within the table 28 which has the closest value to the index in step 50. The method then proceeds to step 52 where the algorithm set associated with the selected row within table 28 is retrieved. The method then proceeds to step 54 where the first encryption algorithm is loaded into the encryption decryption engine 30.

Suitable encryption techniques which might be used in accordance with the teachings of the present invention may comprise, for example, the interpositioning of false data within the actual data stream. For example, the actual data could be broken into set size blocks. Between these blocks can be interposed blocks of false data. A marker or other piece of header data may be placed at the start of the first block of real data to ensure that the system receiving the stream of encrypted data can synchronize its decryption operation. This marker can be repeated during the transmission on a periodic basis to ensure continued synchronization of the decryption process.

Alternatively, the data stream itself can be changed by reversing periodic bits within the data stream. For example, every nth bit of data could be inverted on a frequent enough basis to defeat error correcting codes that handle naturally occurring changes in data streams. Once again, a marker code or header can be inserted a predetermined number of bits before the first inverted bit of data to ensure synchronization with the receiving system. An alternative of this method could also alter the frequency of the reversal of the bit. For example, after the first marker data is encountered the nth bit could be inverted until a next marker. After the next marker every $$\frac{n}{2}$$

bit can be inverted. Following an additional marker, every $$\frac{n}{4}$$

bit can be inverted, and so on.

These are examples of simple encryption systems that can be easily and quickly encrypted and decrypted for both message traffic and real time traffic. Other similar encryption systems could also be employed. If a system is able to utilize several of these simple encryption systems, these methods can be combined to create a combined encryption scheme which is extremely difficult to defeat. In addition, as is disclosed herein, these simple encryption algorithms can be used in sequence during a real time communication to ensure a high degree of security.

The method then proceeds to step 56 where the encryption decryption engine under the direction of the central processing unit 20 runs the first algorithm to encrypt the message. The method then proceeds to step 58 where the interim encrypted message is stored in data storage media 26 by central processing unit 20. The method then proceeds to step 60 where a decision is made as to whether or not the set defined by table 28 has been completed. If the set has not been completed, the method proceeds to step 62 where the next algorithm within the defined set is loaded into the encryption decryption engine 30. The method then returns to step 56 where the next algorithm is executed. If at step 60 the set of defined algorithms has been completed, the method proceeds to step 62 where the encrypted message is sent. The method shown in FIG. 4 can be executed in an almost identical fashion to decrypt a message. The only differences between the decryption method and the encryption method discussed previously is that the associated table row which has been identified using the key value is executed from right to left. In step 58 the interim message is actually a decrypted message which is stored in data storage system 26. Finally, in step 62 the decrypted message is displayed for the user through user interface 22 as opposed to being sent to the network through communication interface 24.

The secure communication techniques of the present invention can also be applied to real time voice communications over wireless or wireline networks. Referring to FIG. 5, a secure telecommunications network indicated generally at 70 constructed according to the teachings of the present invention is described. Network 70 allows the user of a telephone 72 to communicate through a base station 74 to a public switch telephone network 76. Network 76 may also be connected to a telephone 78. As shown in FIG. 5, device 72 comprises a wireless device. In contrast, telephone 78 comprises a conventional wireline telephone device. The teachings of the present invention are equally applicable to communications occurring over wireless or wired connections as both are susceptible in different ways to interception. Telephones 72 and 78 must comprise conventional telephone network interface technology as well as microphones and speakers used in voice communications. In addition, telephones 72 and 78 comprise the components detailed with reference to FIG. 2 and device 14 previously. Accordingly, a user of device 72 can interact with a central processing unit 20 through a user interface 22. In addition, the telephone 72 stores an encryption selection table 28 and has the ability to operate encryption and decryption algorithms using an encryption decryption engine 30. As will be discussed herein, the telephone 72 is also capable of switching from one encryption algorithm to another based upon the input from a timer 32. The telephone 72 interacts with the base station 74 and ultimately the network 76 through communication interface 24.

Referring to FIG. 6, an encryption selection table indicated generally at 80 is shown. Table 80 comprises an encryption key column 82 and an encryption algorithm column 84. It should be understood that table 80 is solely one embodiment of the present invention which is presented solely for purposes of teaching important aspects of the present invention. Other table structures and other key structures can be employed with equal efficacy without departing from the spirit of the present invention. In the embodiment shown in table 80, the key value within key column 82 is a single digit between 0 and 9. Using the techniques discussed previously with reference to table 28 in FIG. 3, a key value can be calculated using a periodic key value and a public variable key value or either one without the other. An index value can be calculated using either or both the periodic key and the public variable key values. The index value is then converted to a key value by merely using the units place of the index value. As shown in FIG. 6, the indicated key value is associated with one of the encryption algorithms which may be executed by the telephone 72 or the telephone 78.

According to a further aspect of this embodiment of the present invention, the telephones 72 and 78 are further operable to switch from one encryption technique to another on a periodic basis. As such, the key value which is calculated from the index value serves as a starting point within table 80. The devices 72 and 78 then step through the table switching to the next row in the table on a periodic basis. According to one embodiment of the present invention, the telephone which initiated the call provides a short tone signal or utilizes out of band signaling to provide an encryption switch signal to the receiving device. The sending device utilizes a timer such as timer 32 to calculate when the switch to the next encryption algorithm should be initiated. In this manner, a telephone conversation can occur which begins using an encryption algorithm and switches to a next indicated encryption algorithm on a periodic basis such as, for example, every 15 or 30 seconds.

Real time communications can utilize the same simple algorithms which have been described previously. In addition, real time communications can take advantage of the natural silences in real time conversations by inserting fixed length sections of conversation from, for example, previous phone calls. Specifically, in an analog device, prior conversations can be buffered and inserted every few fractions of a second. The receiving device can remove the inserted parts of conversation and silence the output for the associated period of time. In this way, the party attempting to intercept the conversation would hear a muddled combination of multiple conversations. Digital phones and other digital transmission devices can accomplish the same thing in the digital domain by sensing and processing the digital equivalent of a silent portion of the conversation.

Alternatively, the transmitting device can periodically insert signals associated with prior portions of the current conversation into the transmitted stream. This could happen in either the analog or digital domains. In this manner, the transmitting device may take a portion of a prior conversation and sum it with the outgoing data stream. The receiving device can perform either a digital subtraction or an analog filtering using the prior portion of the conversation. A party attempting to intercept the device would intercept a greatly distorted signal. However, the receiving device can perform a simple operation to retrieve the clear decrypted signal. Depending upon the data storage capabilities of the devices performing the encryption and decryption operations, various portions of the prior conversation could be stored in parallel. In this manner, the distortion applied to the signal could vary over time as one distorting portion of a conversation is substituted for another. This feature would be limited by the ability of the receiving and transmitting devices to store multiple portions of the prior conversations.

Similarly, the devices can use predetermined and prestored distortion elements that can be added to the signal to prevent an interceptor from discerning the conversation. In other words, instead of using variable portions of the conversation to distort the signal, the signal could be distorted using predetermined elements which are stored within the receiving and transmitting devices. As discussed herein, the receiving and transmitting devices could store multiple distortion elements as separate encryption methods and switch from one to the other as time progresses or as signaled by the transmitting system.

Figure 8:
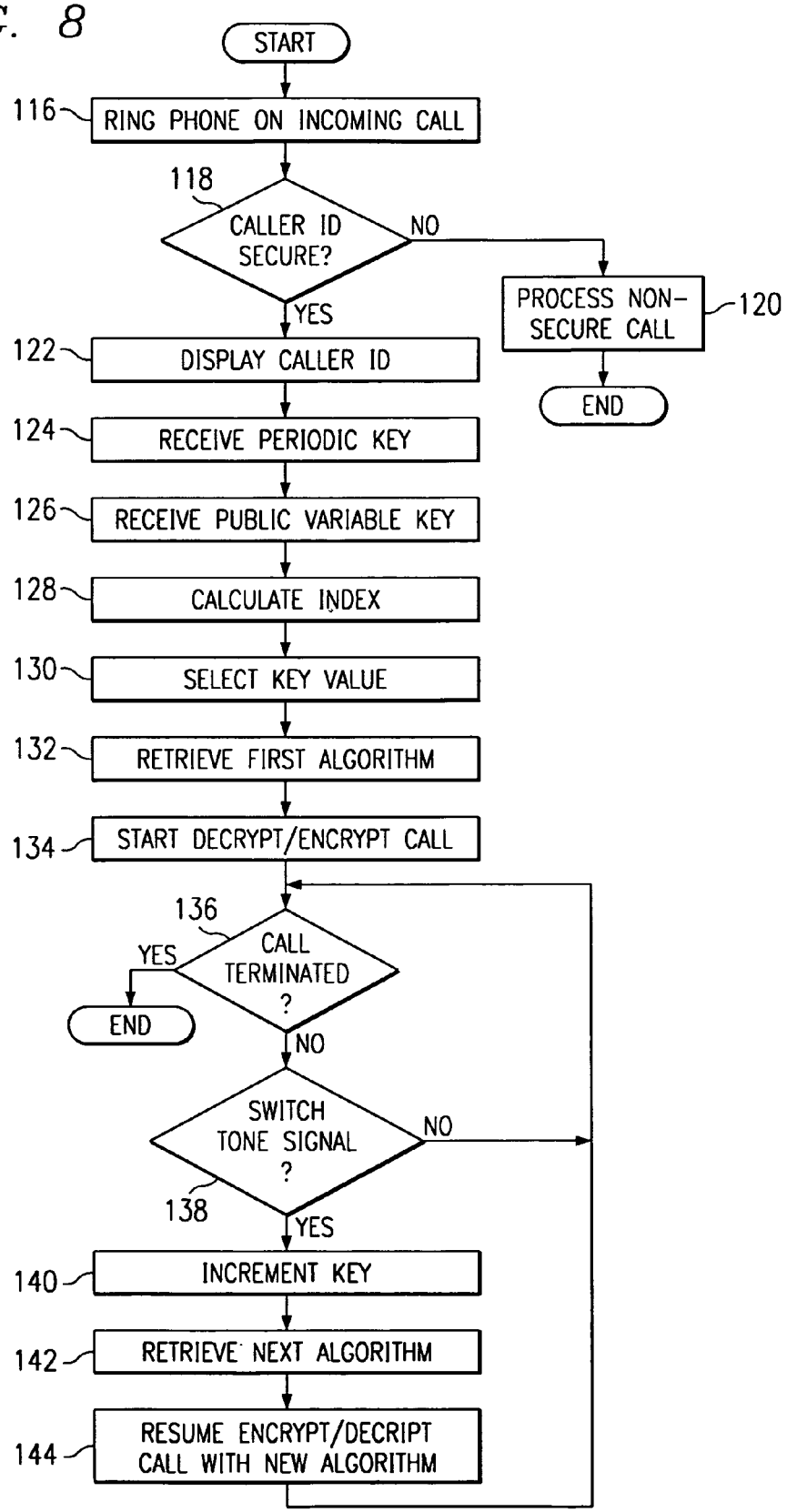

FIGS. 7 and 8 are flow diagrams which detail methods of sending and receiving, respectfully, encrypted telephone communications. Referring to FIG. 7, the method of the present invention begins at step 86 where a user of a device such as telephone 72 selects secure operation prior to the initiation of a telephone call. The method then proceeds to step 88 where the periodic key value is input into the device through the user interface 22. The method then proceeds to step 90 where the public variable key is input in a similar fashion. As discussed previously, the method of the present invention can be employed with equal effectiveness if the method requires the user to calculate the index value outside of the device. In addition, the user interface 22 may require steps 88 and 90 to be performed simultaneously using predetermined formatting as discussed previously. If the device is used to calculate the index value the method proceeds to step 92 where the periodic key value and the public key value are combined using a predetermined mathematical function to create an index value. The method then proceeds to step 94 where a key value is selected as a function of the index. As discussed with reference to FIG. 6, this may employ the use of the units place of the index value to function as the encryption table key value. The method then proceeds to step 96 where the first encryption algorithm is retrieved based on the algorithm identifier within the table 80 described previously. The method then proceeds to step 98 where the central processing unit 20 starts the timer 32 in a countdown mode. The method then proceeds to step 100 where the first algorithm is used to begin the encryption or decryption of the telephone call. The method then proceeds to step 97 where the connection is made through the network 76 to the receiving device 78. This communication entails the encryption of outgoing voice traffic and the decryption of incoming voice traffic.

The method then proceeds to decision point 102 where a determination is made by the device 72 as to whether or not the telephone call has been terminated. If the call has been terminated the method itself terminates. If the call has not been terminated, the method proceeds to a second decision point 104 where a determination is made as to whether or not the timer 32 has expired. If the timer has not expired, the method returns to step 102. If the timer has expired, the central processing unit 20 increments the key value at step 106. The central processing unit 20 then sends a warning switch tone or signal to the receiving device 78 at step 108. As discussed previously, this switch signal can either be a short DTMF tone or other suitable tone or an out of band signal as permitted by the technology associated with the communication devices 72 and 78. This tone may be sent a preset period of time before the switch over to the new algorithm to provide for a suitable set-up period at the receiving device.

The method then proceeds to step 110 where the central processing unit 20 retrieves the next encryption algorithm using the incremented key and the defined point in the table 80. The method then proceeds to step 112 where the timer 32 is reset by the central processing unit 20. The method then proceeds to step 114 where the encryption and decryption of the telecommunications traffic is resumed using the newly indicated encryption algorithm. The method then returns to step 102 where a determination is made as to whether or not the call is terminated.

FIG. 8 is a flow diagram which illustrates the method used by a receiving device such as telephone 78 to receive and decrypt a secure telephone communication from a device such as telephone 72. Referring to FIG. 8, the method begins at step 116 where the telephone 78 is rung upon the occurrence of an incoming call. The telephone system 78 then checks the caller ID information to determine whether or not the caller ID is associated with a party that is capable of secure telephone traffic. Whether or not a party is capable of secure traffic can be stored in the device in the same manner that other indicia of the party such as the name of the party are stored within the receiving device 78 based on caller ID information. If the caller ID indicates that the party is unknown or that it is not capable of secure transmission, the method proceeds to step 120 where the call is processed in a conventional manner on a non-secure basis. The method then terminates upon the termination of the call.

If at step 118, the caller ID information indicates that the calling party is capable of a secure transmission, the method proceeds to step 122 where the caller ID information is displayed to the party receiving the call. Step 122 may be included to enable different periodic and public variable keys to be used for different parties. The receiving device 78 then prompts the user at step 124 to enter the periodic key value. The method then proceeds to step 126 where the device 78 similarly prompts the user to enter the public variable key value. As discussed previously, steps 124 and 126 may be omitted if the system requires the user to calculate an index value without using the device. If the periodic and public variable key values have been entered into the device the method proceeds to step 128 where an index value is calculated using the predetermined mathematical function using techniques described previously. The index value is used to calculate a key value at step 130. As discussed previously, this may comprise the selection of the units digit of the index value as the key value. The receiving device 78 includes a copy of table 80. The copy of table 80 is then used at step 132 to retrieve the first indicated encryption algorithm from the encryption algorithm column 84. This encryption algorithm is then loaded into the encryption decryption engine 30 and is executed by central processing unit 20 to encrypt outgoing communications and decrypt incoming communications at step 134. The method then proceeds to step 136 where a determination is made as to whether or not the call is terminated. If the call is terminated, the method terminates. If the call has not been terminated, the method proceeds to a second decision point 138 where the method checks to see whether or not a switch tone signal has been received. If a switch tone signal has not been received, the method returns to step 136. If a switch tone signal has been received, the method proceeds to step 140 where the central processing unit 20 increments the key value. The method then proceeds to step 142 where the central processing unit 20 uses the incremented key value to retrieve the next encryption algorithm from the table 80. This algorithm is then loaded into the encrypt decrypt engine 30 and the encryption and decryption of communication traffic is resumed using the new encryption algorithm in step 144. The method then returns to step 136.

Accordingly, relatively simple encryption and decryption methods can be executed by telecommunications devices having relatively low processing power. These encryption and decryption methods can be switched on a periodic basis during the telephone call to further hamper the efforts of a party trying to intercept the call. As such, the party attempting interception of the call not only has to determine which of several encryption methods are being used but has to continually change to different encryption methods on a periodic basis in order to completely decrypt the telecommunications traffic.

Although the present invention has been described in detail, it should be understood that various changes, alterations, substitutions, and modifications may be made to the teachings described herein without departing from the scope of the present invention which is solely defined by the appended claims.

What is claimed is:

1. A method for communicating a data message, comprising:

selecting a table key value in an encryption selection table based on an index that is a function of a periodic key value and a public variable key value, the encryption selection table specifying at least one of a plurality of encryption methods to be used to encrypt a data message, the table key value associated with at least one of the plurality of encryption methods;

encrypting the data message using the encryption method associated with the table key value; and transmitting the encrypted data message over a data communication network.

2. The method of claim 1 and further comprising:

receiving a periodic key value and a public variable key value at a communication device storing the encryption selection table; and calculating the index from the public variable key value and the periodic key values.

3. The method of claim 1 and further comprising:
selecting a second encryption method also specified by the table key value from the encryption selection table; and
encrypting the data message a second time using the second encryption method prior to transmitting the encrypted message.

4. The method of claim 1 wherein the periodic key value comprises a predetermined number agreed upon between a transmitter and a recipient of the data message.

5. The method of claim 1 wherein the public variable key value comprises a numeric value which is variable and which is available to both the recipient and the transmitter of the data message.

6. A data communication device operable to transmit and receive data messages to and from a data communication network, the device comprising:
a central processing unit operable to interface with a user of the device through a user interface;
an encryption decryption engine under the control of the central processing unit and operable to execute a plurality of encryption programs, each of the encryption programs being different than the remainder of the plurality and each of the encryption programs operable to receive a message and to output an encrypted message;
an encryption selection table accessible using a key value, the encryption selection table specifying at least one of the plurality of encryption programs associated with each key value, wherein the key value comprises a table key value and further comprising a user interface operable to prompt a user of the device and to receive a public variable key value and a periodic key value, the table key value calculated as a function of at least one or both of the public variable key value and the periodic key value; and
a communication interface operable to transmit an encrypted message to the user of the device, the encrypted message encrypted using the at least one encryption program specified in the encryption selection table.

7. The device of claim 6 wherein the encryption selection table specifies a plurality of encryption methods to be used in sequence for each of the key values and wherein the encryption engine is operable to encrypt a data message using each of the plurality of encryption programs in sequence prior to transmitting the encrypted data message.

8. The device of claim 6 wherein the public variable key value comprises a numeric value which is variable and which is available to both the recipient and the transmitter of the data message.

9. The device of claim 6 wherein the periodic key value comprises a predetermined number agreed upon between a transmitter and a recipient of the data message.

10. The method of claim 1, wherein selecting the table key value comprises determining which table key value in the encryption selection table is approximately equal to the index.

11. The method of claim 2, wherein calculating the index comprises using a pre-determined mathematical function to calculate the index.

12. The method of claim 1, further comprising encrypting the data message with at least two encryption methods in a specific sequence as provided in the encryption selection table.

13. The method of claim 12, further comprising decrypting the data message by executing the encryption methods in an opposite sequence as provided in the encryption selection table.

14. A method for communicating a data message, comprising:
receiving a periodic key value and a public variable key value at a communication device storing an encryption selection table;
calculating an index from the public variable key value and the periodic key values using a pre-determined mathematical function;
selecting a table key value in the encryption selection table based on the calculated index, the encryption selection table specifying at least one of a plurality of encryption methods to be used to encrypt a data message, the table key value associated with at least one of the plurality of encryption methods;
encrypting the data message using the encryption method associated with the table key value; and
transmitting the encrypted data message over a data communication network.

15. The method of claim 14, further comprising:
selecting a second encryption method also specified by the table key value from the encryption selection table; and
encrypting the data message a second time using the second encryption method prior to transmitting the encrypted message.

16. The method of claim 14, wherein the periodic key value comprises a predetermined number agreed upon between a transmitter and a recipient of the data message.

17. The method of claim 14, wherein the public variable key value comprises a numeric value which is variable and which is available to both the recipient and the transmitter of the data message.

18. The method of claim 14, wherein selecting the table key value comprises determining which table key value in the encryption selection table is approximately equal to the calculated index.

19. The method of claim 14, further comprising encrypting the data message with at least two encryption methods in a specific sequence as provided in the encryption selection table.

20. The method of claim 14, further comprising decrypting the data message by executing the encryption methods in an opposite sequence as provided in the encryption selection table.

* * * * *